(12) United States Patent
Zhang et al.

(10) Patent No.: US 11,388,730 B2
(45) Date of Patent: Jul. 12, 2022

(54) BEAM RECOVERY FRAME STRUCTURE AND RECOVERY REQUEST FOR COMMUNICATION SYSTEMS

(71) Applicant: Apple Inc., Cupertino, CA (US)

(72) Inventors: Yushu Zhang, Beijing (CN); Wook Bong Lee, Pleasanton, CA (US); Gang Xiong, Portland, OR (US); Hong He, Sunnyvale, CA (US); Yongjun Kwak, Portland, OR (US); Daewon Lee, Portland, OR (US); Seung Hee Han, San Jose, CA (US); Alexei Davydov, Nizhny Novgorod (RU); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 16/483,252

(22) PCT Filed: Mar. 23, 2018

(86) PCT No.: PCT/US2018/023967
§ 371 (c)(1),
(2) Date: Aug. 2, 2019

(87) PCT Pub. No.: WO2018/175852
PCT Pub. Date: Sep. 27, 2018

(65) Prior Publication Data
US 2020/0008209 A1 Jan. 2, 2020

Related U.S. Application Data

(60) Provisional application No. 62/520,843, filed on Jun. 16, 2017.

(30) Foreign Application Priority Data

Mar. 24, 2017 (WO) ................ PCT/CN2017/078118

(51) Int. Cl.
*H04W 72/08* (2009.01)
*H04B 17/318* (2015.01)
(Continued)

(52) U.S. Cl.
CPC ....... *H04W 72/085* (2013.01); *H04W 72/046* (2013.01); *H04W 72/048* (2013.01); *H04W 72/0446* (2013.01); *H04W 76/19* (2018.02)

(58) Field of Classification Search
None
See application file for complete search history.

(56) References Cited

U.S. PATENT DOCUMENTS

2015/0237617 A1* 8/2015 Chen ................... H04B 7/0617
370/329
2017/0331577 A1* 11/2017 Parkvall ................. H04W 4/00
(Continued)

OTHER PUBLICATIONS

International Search Report dated Aug. 28, 2018 for International Application No. PCT/US2018/023967.
(Continued)

*Primary Examiner* — Sai Aung
(74) *Attorney, Agent, or Firm* — Eschweiler & Potashnik, LLC

(57) ABSTRACT

An apparatus is configured to be employed within a base station. The apparatus comprises baseband circuitry which includes a radio frequency (RF) interface and one or more processors. The one or more processors are configured to select one or more recovery channels based on one or more recovery factors; determine a beam recovery frame structure using the selected one or more recovery channels and based at least partially on beam correspondence capabilities; and provide the selected one or more recovery channels and the determined beam recovery frame structure to the RF interface for transmission to a user equipment (UE) device.

21 Claims, 9 Drawing Sheets

(51) Int. Cl.
*H04W 76/19* (2018.01)
*H04W 72/04* (2009.01)

(56) References Cited

U.S. PATENT DOCUMENTS

| | | | | |
|---|---|---|---|---|
| 2017/0331670 | A1* | 11/2017 | Parkvall | H04J 11/0079 |
| 2018/0234960 | A1* | 8/2018 | Nagaraja | H04B 17/318 |
| 2019/0053294 | A1* | 2/2019 | Xia | H04B 7/088 |
| 2019/0281563 | A1* | 9/2019 | Lee | H04B 7/0695 |
| 2019/0281624 | A1* | 9/2019 | Kim | H04L 27/26 |
| 2020/0014453 | A1* | 1/2020 | Takeda | H04W 56/001 |
| 2020/0099437 | A1* | 3/2020 | Harada | H04L 5/0053 |
| 2020/0404640 | A1* | 12/2020 | Islam | H04W 72/046 |
| 2021/0120574 | A1* | 4/2021 | Takeda | H04W 72/042 |

OTHER PUBLICATIONS

"RACH preamble design." Source: Samsung. Agenda Item: 8.1.1.4.1. 3GPP TSG RAN WG1 NR #88, Athens, Greece, Feb. 13-17, 2017. R1-1702908.

"Beam management procedures for UL." Source: Nokia, Alcatel-Lucent Shanghai Bell. Agenda Item: 8.1.2.2.4. 3GPP TSG RAN WG1#88, Athens, Greece, Feb. 13-17, 2017. R1-1703169.

International Preliminary Report on Patentability dated Sep. 24, 2019 for International Application No. PCT/US2018/023967.

* cited by examiner

FRAME STRUCTURE TYPE 1
WITH BEAM CORRESPONDANCE

FRAME STRUCTURE TYPE 2
WITHOUT BEAM CORRESPONDANCE

| PRACH | PUCCH |
|---|---|
| OMNI DIRECTIONAL UE<br><br>DIRECTIONAL UE<br>(WITHOUT A CONFIGURED PUCCH RESOURCE) | DIRECTIONAL UE |

USE CASE IN OPTION 1 OF RECOVERY CHANNEL SELECTION

| PRACH | PUCCH |
|---|---|
| NEW BEAM IDENTIFIED FROM SS-BLOCK<br><br>NO CONFIGURED PUCCH RESOURCE | NEW BEAM IDENTIFIED FROM CSI-RS |

USE CASE IN OPTION 2 OF RECOVERY CHANNEL SELECTION

| PRACH | PUCCH |
|---|---|
| BEAM CORRESPONDENCE IN BOTH gNB AND UE<br><br>NO CONFIGURED PUCCH RESOURCE | WITHOUT BEAM CORRESPONDENCE FOR gNB and/or UE |

USE CASE IN OPTION 3 OF RECOVERY CHANNEL SELECTION

BEAM RECOVERY FRAME STRUCTURE AND RECOVERY REQUEST FOR COMMUNICATION SYSTEMS

REFERENCE TO RELATED APPLICATIONS

This application is a National Phase entry application of International Patent Application No. PCT/US2018/023967 filed Mar. 23, 2018, which claims priority to International Application PCT/CN2017/078118, filed Mar. 24, 2017 and entitled "FRAME STRUCTURE OF BEAM RECOVERY SIGNAL" and claims the benefit of U.S. Provisional Application No. 62/520,843 filed Jun. 16, 2017, entitled "DIFFERENTIAL BEAM RECOVERY REQUEST" and is hereby incorporated by reference in its entirety.

FIELD

Various embodiments generally relate to the field of wireless communications.

BACKGROUND

Wireless or mobile communication involves wireless communication between two or more devices. The communication requires resources to transmit data from one device to another and/or to receive data at one device from another.

The communication between devices can utilize various channels or beams to transfer information. Interference, changing locations and the like can cause beams to fail. For example, interference can block signals and degrade the communications using a particular beam.

What are needed are techniques to facilitate recovering from beam degradation, including beam recovery.

BRIEF DESCRIPTION OF THE DRAWINGS

FIG. 8 is a table illustrating selection of recovery channels in accordance with some embodiments.

FIG. 9 is a table illustrating selection of recovery channels in accordance with some embodiments.

FIG. 10 is a table illustrating selection of recovery channels in accordance with some embodiments.

DETAILED DESCRIPTION

Figure 1:
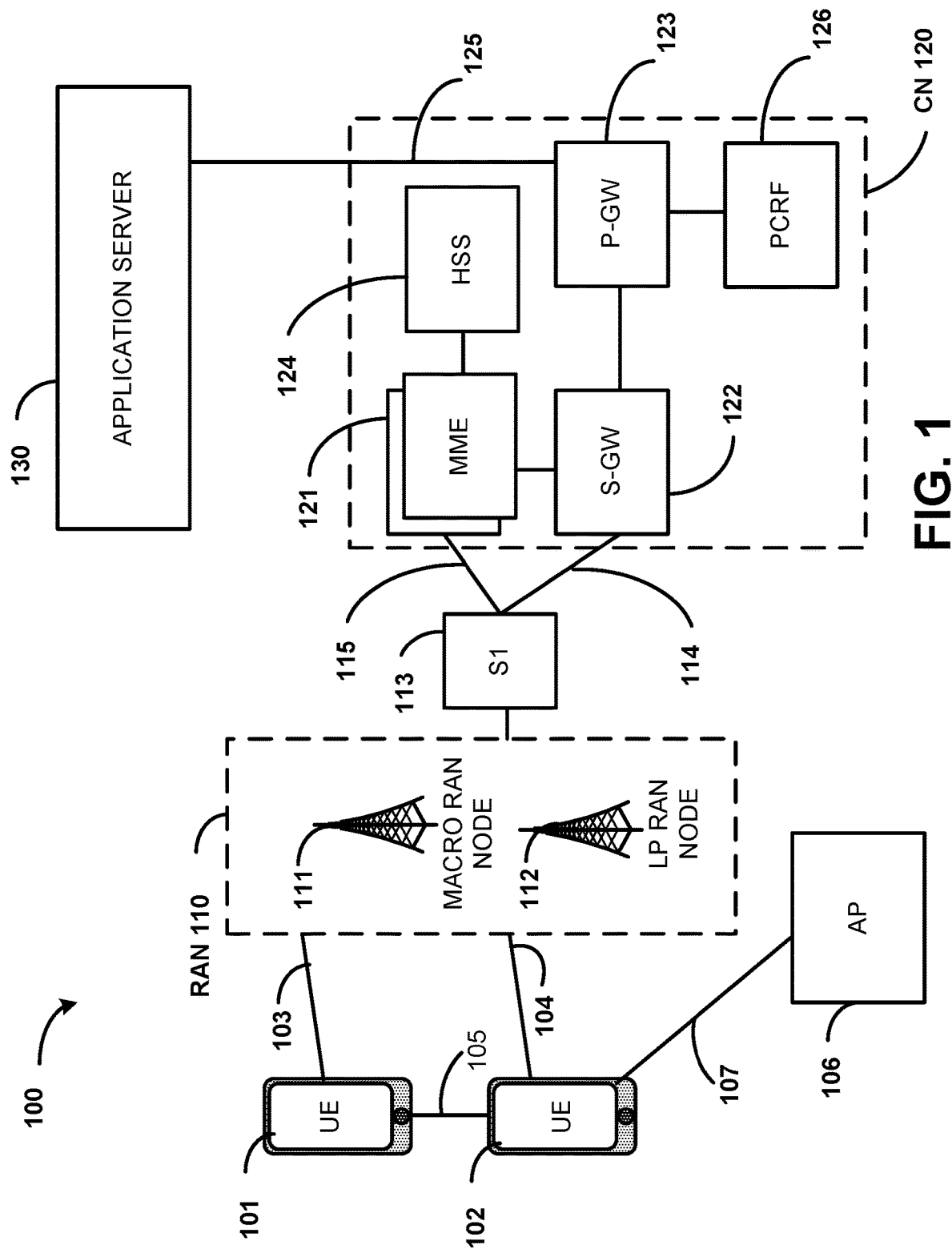
FIG. 1 illustrates a block diagram of an example wireless communications network environment for a network device (e.g., a UE, gNB or an eNB) according to various aspects or embodiments.

The present disclosure will now be described with reference to the attached drawing figures, wherein like reference numerals are used to refer to like elements throughout, and wherein the illustrated structures and devices are not necessarily drawn to scale. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Embodiments herein may be related to RAN1 and 5G.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It is appreciated that there is a continuing need to improve data rates and performance. Techniques for improving data rates can include lowering overhead and/or better utilizing resources.

Wireless communication systems can involve nodes, such as a base station, communicating with devices, such as user equipment (UE) devices. The nodes can also include evolved Node Bs (eNBs), gNBs, and the like. The systems utilize downlink (DL) communications from the base stations to the UE devices and uplink (UL) communications from the UE devices to the base stations. Various techniques and schemes can be used for uplink and downlink communications.

Beamforming is used to establish and maintain wireless communications between devices, such as UE devices, eNBs and gNBs. The beamforming forms or establishes beams or channels for data and/or control channels. However, communication characteristics can change, such as interfering objects, walls, device location changes, and the like. The communication characteristics and other interference can lead to degraded beams and/or beam failure.

Beam recovery occurs when an existing beam has degraded or failed. The beam recovery involves using one or more reference/recovery signals to form or reform a beam to replace or enhance a failed beam.

The one or more reference/recovery signals can be provided by a UE device or node in a control channel, such as a physical uplink channel (PUCCH) or a physical random access channel (PRACH) and the like. The channel containing the recovery signals can also be referred to as a recovery signal (SR) channel. The SR channel can include PUCCH, PRACH and the like.

Receive beam sweeping at a gNB can be applied to both PRACH and SR channel to receive the recovery signals in multiple directions.

A frame structure for recovery channels, such as the PRACH channel and the SR channel, is determined to facilitate aligning the receive beam sweeping. The frame structure can also be based on uplink/downlink beam correspondence. The frame structure can also be further based on the beam correspondence.

Embodiments are disclosed that determine/support a frame structure for channels, such as the PRACH, and beam recovery with beam correspondence and without beam correspondence. The embodiments also include control signaling to indicate the supported/determined recovery frame structure.

Additionally, it is appreciated that communication systems, such as a gNB and UE, can maintain a plurality of beams. These beams can be referred to as a gNB-UE beam pair link (BPL). A suitable or selected BPL can provide antenna gain so that a link budget for the BPL can be increased. However, due to interference, rotation, movement, and the like, the quality of a BPL can decrease. If the quality of the BPL drops below a threshold, a beam recovery procedure can be initiated to identify a new BPL for the plurality of beams maintained by the system. Then, recovery channels, including PRACH and PUCHH can be used to transmit a beam recovery request.

Embodiments are additionally disclosed that identify or distinguish use cases or techniques of PRACH and PUCCH for beam recovery. The techniques can include use of PRACH and/or PUCCH based on UE device antenna structure, a state of new beams (such as gNB beams), a beam correspondence state and the like.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). A network device as referred to herein can include any one of these APs, ANs, UEs or any other network component. The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink (UL) and downlink (DL) dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It is appreciated that an MTC physical downlink control channel (MPDCCH) and/or an enhanced physical downlink control channel (EPDCCH) can be used in placed of the PDCCH. The It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the CN network 120 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

In one or more embodiments, IMS services can be identified more accurately in a paging indication, which can enable the UEs 101, 102 to differentiate between PS paging and IMS service related paging. As a result, the UEs 101, 102 can apply preferential prioritization for IMS services as desired based on any number of requests by any application, background searching (e.g., PLMN searching or the like), process, or communication. In particular, the UEs 101, 102 can differentiate the PS domain paging to more distinguishable categories, so that IMS services can be identified clearly in the UEs 101, 102 in comparison to PS services. In addition to a domain indicator (e.g., PS or CS), a network (e.g., CN 120, RAN 110, AP 106, or combination thereof as an eNB or the other network device) can provide further, more specific information with the TS 36.331-Paging message, such as a "paging cause" parameter. The UE can use this information to decide whether to respond to the paging, possibly interrupting some other procedure like an ongoing PLMN search.

In one example, when UEs 101, 102 can be registered to a visited PLMN (VPLMN) and performing PLMN search (i.e., background scan for a home PLMN (HPLMN) or a higher priority PLMN), or when a registered UE is performing a manual PLMN search, the PLMN search can be interrupted in order to move to a connected mode and respond to a paging operation as part of a MT procedure/operation. Frequently, this paging could be for PS data (non-IMS data), where, for example, an application server 130 in the NW wants to push to the UE 101 or 102 for one of the many different applications running in/on the UE 101 or 102, for example. Even though the PS data could be delay tolerant and less important, in legacy networks the paging is often not able to be ignored completely, as critical services like an IMS call can be the reason for the PS paging. The multiple interruptions of the PLMN search caused by the paging can result in an unpredictable delay of the PLMN search or in the worst case even in a failure of the procedure, resulting in a loss of efficiency in network communication operations. A delay in moving to or handover to a preferred PLMN (via manual PLMN search or HPLMN search) in a roaming condition can incur more roaming charges on a user as well.

Figure 2:
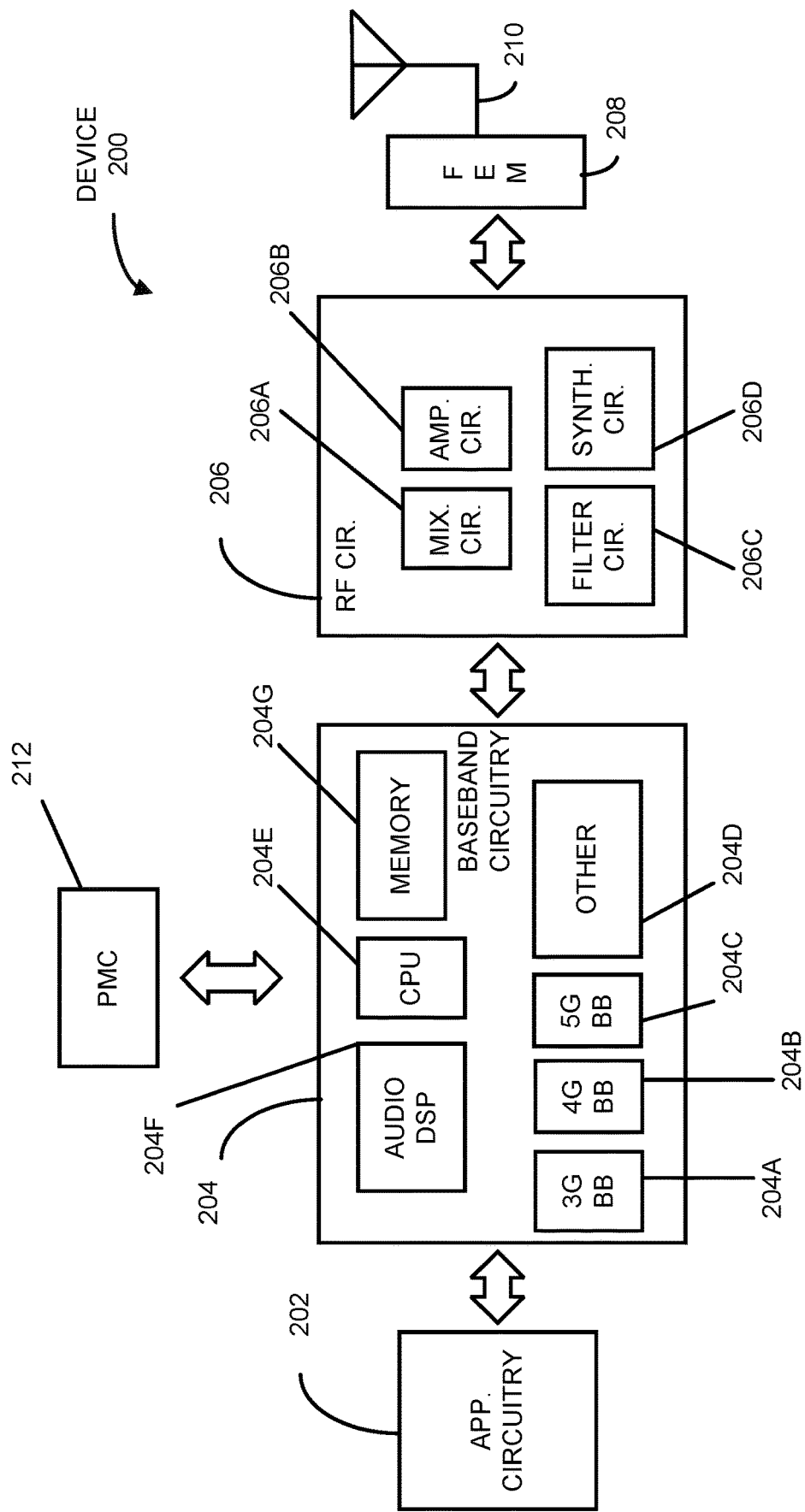
FIG. 2 illustrates another block diagram of an example of wireless communications network environment for a network device (e.g., a UE, gNB or an eNB) according to various aspects or embodiments.

FIG. 2 illustrates example components of a network device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 101, 102 or a RAN node 111, 112, AP, AN, eNB or other network component. In some embodiments, the device 200 can include less elements (e.g., a RAN node can not utilize application circuitry 202, and instead include a processor/controller to process IP data received from an EPC). In some embodiments, the network device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), si2h generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 does not receive data in this state, in order to receive data, it transitions back to RRC_Connected state.

An additional power saving mode can allow a device to be unavailable to the network for periods longer than a paging interval (ranging from seconds to a few hours). During this time, the device can be unreachable to the network and can power down completely. Any data sent during this time can incur a large delay with the delay presumed to be acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node. Each of these layers can be implemented to operate one or more processes or network operations of embodiments/aspects herein.

In addition, the memory 204G can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In general, there is a move to provide network services for the packet domain. The earlier network services like UMTS or 3G and predecessors (2G) configured a CS domain and a packet domain providing different services, especially CS services in the CS domain as well as voice services were considered to have a higher priority because consumers demanded an immediate response. Based on the domain that the paging was received, the device 200 could assign certain priority for the incoming transaction. Now with LTE/5G most services are moving to the packet domain. Currently, the UE (e.g., 101, 102, or device 200) can get paging for a packet service without knowing any further information about the paging of the MT procedure, such as whether someone is calling on a line, a VoIP call, or just some packet utilized from Facebook, other application service, or other similar MT service. As such, a greater opportunity exists for further delays without the possibility for the UE to discriminate between the different application packets that could initiate a paging and also give a different priority to it based on one or more user preferences. This can could be important for the UE because the UE might be doing other tasks more vital for resource allocation.

In one example, a UE (e.g., 101, 102, or device 200) could be performing a background search for other PLMNs. This is a task the UE device 200 could do in regular intervals if it is not connected on its own home PLMN or a higher priority PLMN, but roaming somewhere else. A higher priority could be a home PLMN or some other PLMNs according to a list provided by the provider or subscriber (e.g., HSS 124). Consequently, if a paging operation arrives as an MT service and an interruption results, such that a start and begin operation are executed, a sufficient frequency of these interruptions could cause the UE to never complete a background search in a reasonable way. This is one way where it would be advantageous for the UE or network device to know that the interruption is only a packet service, with no need to react to it immediately, versus an incoming voice call that takes preference immediately and the background scan should be postponed.

Additionally, the device 200 can be configured to connect or include multiple subscriber identity/identification module (SIM) cards/components, referred to as dual SIM or multi SIM devices. The device 200 can operate with a single transmit and receive component that can coordinate between the different identities from which the SIM components are operating. As such, an incoming voice call should be responded to as fast as possible, while only an incoming packet for an application could be relatively ignored in order to utilize resources for the other identity (e.g., the voice call or SIM component) that is more important or has a higher priority from a priority list/data set/or set of user device preferences, for example. This same scenario can also be utilized for other operations or incoming data, such as with a PLMN background search such as a manual PLMN search, which can last for a long period of time since, especially with a large number of different bands from 2G, etc. With an ever increasing number of bands being utilized in wireless communications, if paging interruptions come in between the operations already running without distinguishing between the various packet and real critical services such as voice, the network devices can interpret this manual PLMN search to serve and ensure against a drop or loss of any increment voice call, with more frequent interruptions in particular.

As stated above, even though in most of these cases the PS data is delay tolerant and less important, in legacy networks the paging cannot be ignored completely, as critical services like an IMS call can be the reason for the PS paging. The multiple interruptions of a PLMN search caused by the paging can result in an unpredictable delay of the PLMN search or in the worst case even in a failure of the procedure. Additionally, a delay in moving to preferred PLMN (via manual PLMN search or HPLMN search) in roaming condition can incur more roaming charges on user. Similarly, in multi-SIM scenario when UE is listening to paging channel of two networks simultaneously and has priority for voice service, a MT IMS voice call can be interpreted as "data" call as indicated in MT paging message and can be preceded by MT Circuit Switched (CS) paging of an other network or MO CS call initiated by user at same time. As such, embodiments/aspects herein can increase the call drop risk significantly for the SIM using IMS voice service.

In embodiments, 3GPP NW can provide further granular information about the kind of service the network is paging for. For example, the Paging cause parameter could indicate one of the following values/classes/categories: 1) IMS voice/video service; 2) IMS SMS service; 3) IMS other services (not voice/video/SMS-related; 4) any IMS service; 5) Other PS service (not IMS-related). In particular, a network device (e.g., an eNB or access point) could only be discriminating between IMS and non-IMS services could use 4) and 5), whereas a network that is able to discriminate between different types of IMS services (like voice/video call, SMS, messaging, etc.) could use 3) instead of 4) to explicitly indicate to the UE that the paging is for an IMS service different from voice/video and SMS. By obtaining this information UE may decide to suspend PLMN search only for critical services like incoming voice/video services.

In other aspects, dependent on the service category (e.g., values or classes 1-5 above), the UE 101, 102, or device 200 can memorize that there was a paging to which it did not respond, and access the network later, when the PLMN search has been completed and the UE decides to stay on the current PLMN. For example, if the reason for the paging was a mobile terminating IMS SMS, the MME can then inform the HSS (e.g., 124) that the UE is reachable again, and the HSS 124 can initiate a signaling procedure which will result in a delivery of the SMS to the UE once resources are more available or less urgent for another operation/application/or category, for example. To this purpose the UE 101, 102, or 200 could initiate a periodic tau area update (TAU) procedure if the service category in the Paging message indicated "IMS SMS service", for example.

Figure 3:
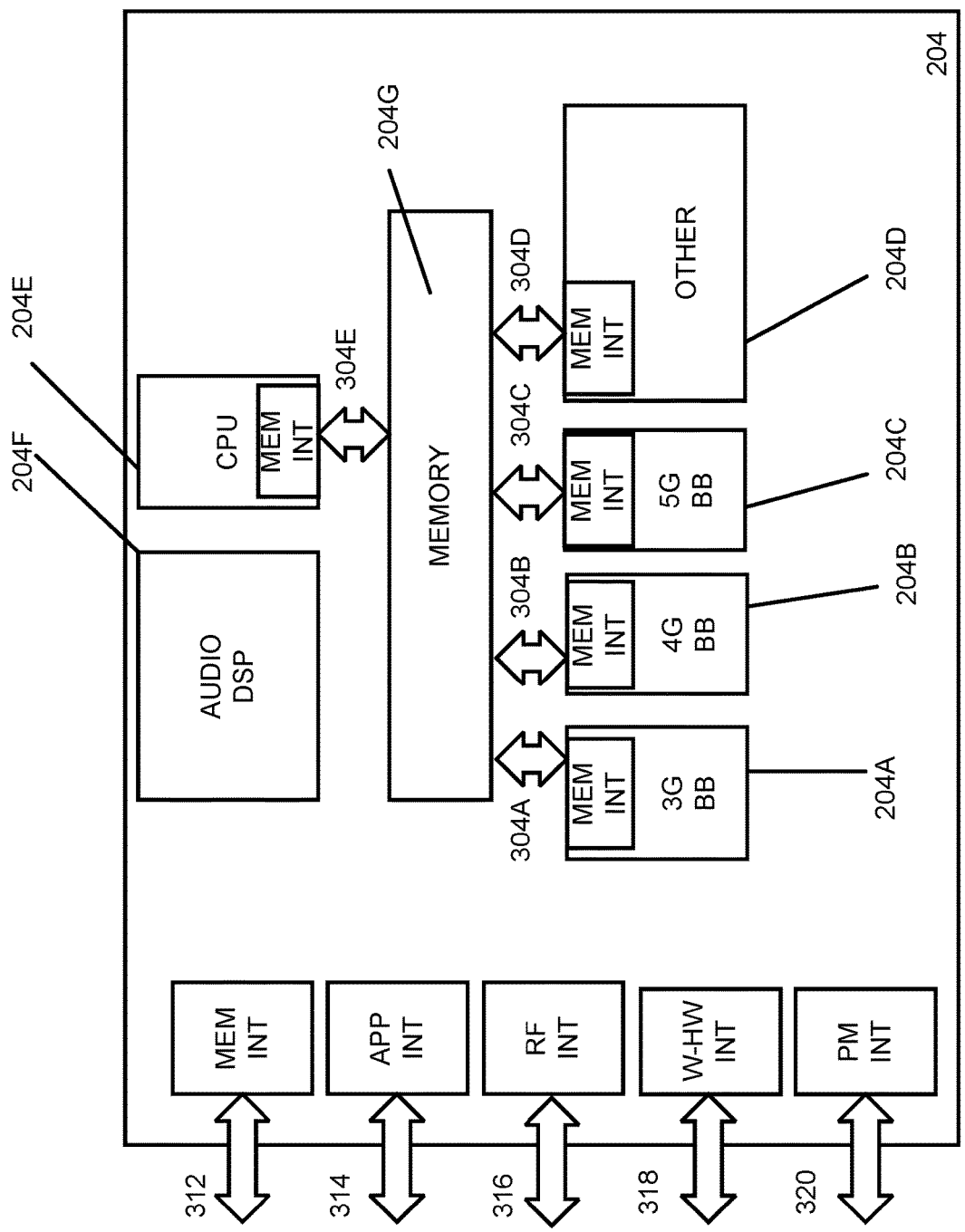
FIG. 3 another block diagram of an example of wireless communications network environment for network device (e.g., a UE, gNB or an eNB) with various interfaces according to various aspects or embodiments.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212.

Figure 4:
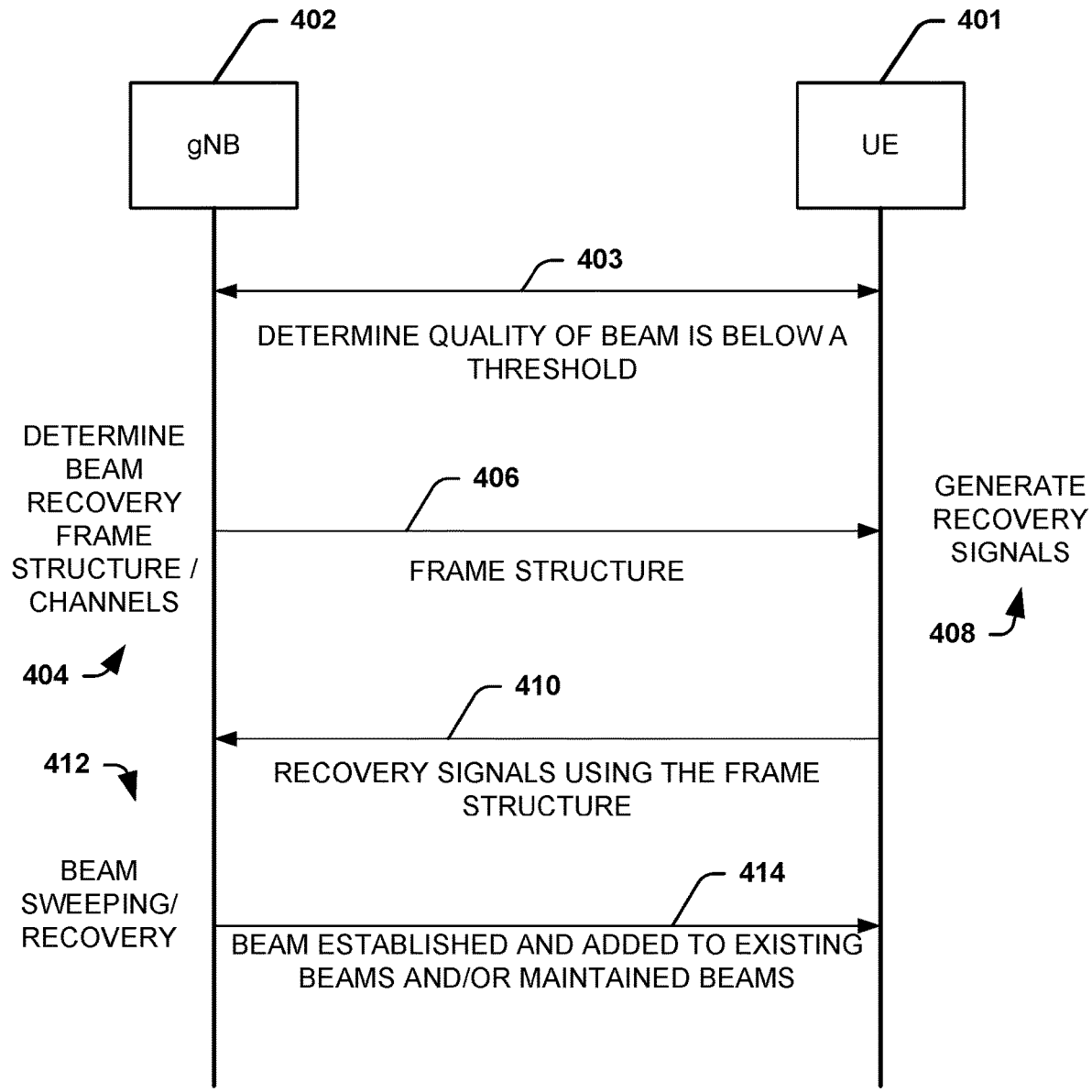
FIG. 4 is a diagram illustrating an architecture of a system that generates and utilizes a recovery beam frame structure for beam recovery/formation.

FIG. 4 is a diagram illustrating an architecture of a system 400 that generates and utilizes a recovery beam frame structure for beam recovery/formation. The system or apparatus 400 can be utilized with the above embodiments and variations thereof, including the system 100 described above. The system 400 is provided as an example and it is appreciated that suitable variations are contemplated.

The system 400 includes a network device 401 and a node 402. The device 401 is shown as a UE device and the node 402 is shown as gNB for illustrative purposes. It is appreciated that the UE device 401 can be other network devices, such as APs, ANs and the like. It is also appreciated that the gNB 402 can be other nodes or access nodes (ANs), such as BSs, eNB, gNB, RAN nodes and the like. Other network or network devices can be present and interact with the device 401 and/or the node 402. Operation of the device 401 and/or the node 402 can be performed by circuitry, such as the baseband circuitry 204, described above.

Downlink (DL) transmissions occur from the gNB 402 to the UE 401 whereas uplink (UL) transmissions occur from the UE 401 to the gNB 402. The downlink transmissions utilize a DL control channel and a DL data channel. The uplink transmissions utilize an UL control channel and a UL data channel. The various channels can be different in terms of direction, link to another gNB, eNB and the like.

The UE 401 is one of a set or group of UE devices assigned to or associated with a cell of the gNB 402.

One or more beams or a plurality of beams between the UE 401 and the gNB 402 can be formed, utilized and maintained. The beams are used for UL and/or DL communications. The beams can be used for control and/or data channels.

In one example, the UE 401 and the gNB 402 maintain a plurality of beams or links. The plurality of beams can also be referred to a beam pair link or a gNB-UE beam pair link (BPL) and can provide an antenna gain or selected antenna gain to increase a link budget.

A quality for a beam can be in terms of interference, signal strength, antenna gain, link budget, signal to noise ratio (SNR), a channel quality indicator (CQI), carrier to interference noise ration (CINR) and the like.

A beam can degrade due to communication characteristics, such as interference, objects, changing locations and the like. Once degraded, the gNB 402 and/or the UE 401 can initiate a beam recovery at 403. The beam recovery can be for uplink and/or downlink communications.

In one example, a beam recovery is initiated upon a beam or BPL falling below a quality threshold.

In another example, the UE 401 determines that a beam quality has fallen below a quality threshold and sends a request to initiate beam recovery using a request recovery channel.

The UE 401 and/or the gNB 402 can also select/determine the request recovery channel, also referred to as a differential recovery request and can be based on recovery factors. The recovery factors can include antenna structure, UE antenna structure, a state of new and/or existing beams, beam correspondence capabilities of the UE 401 and/or the gNB 402, and the like As part of the beam recovery, the gNB 402 determines a frame structure for recovery signals at 404. The frame structure is generated to facilitate beam sweeping and/or general beam formation by the gNB 402. The frame structure is also determined based on beam correspondence, recovery signals, type of recovery signals, uplink channels to be used, channel alignment, presence and number of antenna ports, presence and number of antenna panels, and the like.

In one example, the recovery frame structure is generated with beam correspondence. In another example, the recovery frame structure is generated without beam correspondence. In yet another example, control signaling indicates the recovery frame structure. In another example, the recovery frame structure includes alignment of recovery signals. In still another example, the recovery frame structure uses multiple antenna panels and is operable without alignment of the recovery signals.

The gNB 402 and/or the UE 401 can also select or determine recovery channels to use, such as PRACH, PUCCH, and the like based on recovery channel factors. The recovery channel factors can include antenna structure, UE antenna structure, a state of new and/or existing beams, beam correspondence capabilities of the UE 401 and/or the gNB 402, and the like.

In one example, the determined recovery channel(s) are selected based on an antenna structure for the UE 401, state of existing beams between the UE 401 and the gNB 402, a beam correspondence or beam correspondence state for the UE 401 and the gNB 402, and the like.

The determined frame structure is provided at 406 to the UE 401 using signaling, control channels and/or other suitable techniques.

The UE 401 generates beam recovery signals at 408. The beam recovery signals can be assigned for varied directions, locations, antenna ports, channels, frequencies, signal strengths, and the like.

The UE 401 uses the determined frame structure to provide the beam recovery signals to the gNB 402 as shown at 410.

In one example, the beam recovery signals are multiplexed with the determined beam recovery channel(s). In another example, a beam recovery signal is multiplexed with a PRACH in a frequency division multiplexing (FDM) manner.

The multiplexed recovery channels having the beam recovery signal(s) are provided/transmitted with the determined frame structure as one or more recovery frames.

The gNB 402 receives and obtains the beam recovery signals and performs beam recovery at 412. The beam recovery establishes/forms a beam or BPL between the gNB 402 and the UE 401.

The established beam is added to the one or more maintained beams between the gNB 402 and the UE 401 at 414.

In one example, the gNB 402 performs beam sweeping or a beam sweeping operation for beam recovery and/or beam formation.

It is noted that receive (Rx) beam sweeping can be used for a PRACH and SR channels, for a particular UE device. If beam correspondence is confirmed for a particular UE (the UE 401) and the gNB 402, the UE 401 can use a single transmit (Tx) beam to transmit the PRACH and SR channels.

However, without beam correspondence, the UE 401 may have to transmit the PRACH and SR in multiple time instances. Further, without beam correspondence, the gNB typically receives the PRACH and SR channels in multiple directions to perform suitable receive beam sweeping.

For illustrative purposes, a second channel is shown and described as a recovery signal (SR) channel. However, it is appreciated that the second channel can be a PUCCH, PRACH and/or other channel suitable for beam recovery. Similarly, a first channel is shown and described as a PRACH, however it is appreciated that the first channel can be an SR channel, PUCHH, PRACH and/or other channel suitable for beam recovery.

As shown above, the recovery frame structure can include a first structure/case with beam correspondence and a second structure/case without beam correspondence or with partial beam correspondence. For either case, a boundary/alignment of K SR channel repetitions and K PRACH repetitions can be the same, where K indicates a subcarrier spacing scaling factor between the SR channel and the PRACH. The K can be pre-defined, configured by higher layer signaling, configured within downlink control information (DCI) and the like.

Beam correspondence generally means one or more conditions or correlations are present. A transmission reception point (TRxP), such as the gNB 402, is able to determine a TRxP receive (Rx) beam for the uplink reception based on UE's downlink measurement on TRxP's one or more transmit (Tx) beams. The TRxP is able to determine a TRxP Tx beam for the downlink transmission based on TRxP's uplink measurement on TRxP's one or more Rx beams.

Tx/Rx beam correspondence at UE (UE 401) holds if at least one of the following is satisfied: a UE is able to determine a UE Tx beam for the uplink transmission based on UE's downlink measurement on UE's one or more Rx beams, the UE is able to determine a UE Rx beam for the downlink reception based on TRxP's indication based on uplink measurement on UE's one or more Tx beams, and/or capability indication of UE beam correspondence related information to TRxP is supported.

In one example, a beam sweeping involves an operation of covering a spatial area, with beams transmitted and/or received during a time interval in a predetermined way.

Figure 5:
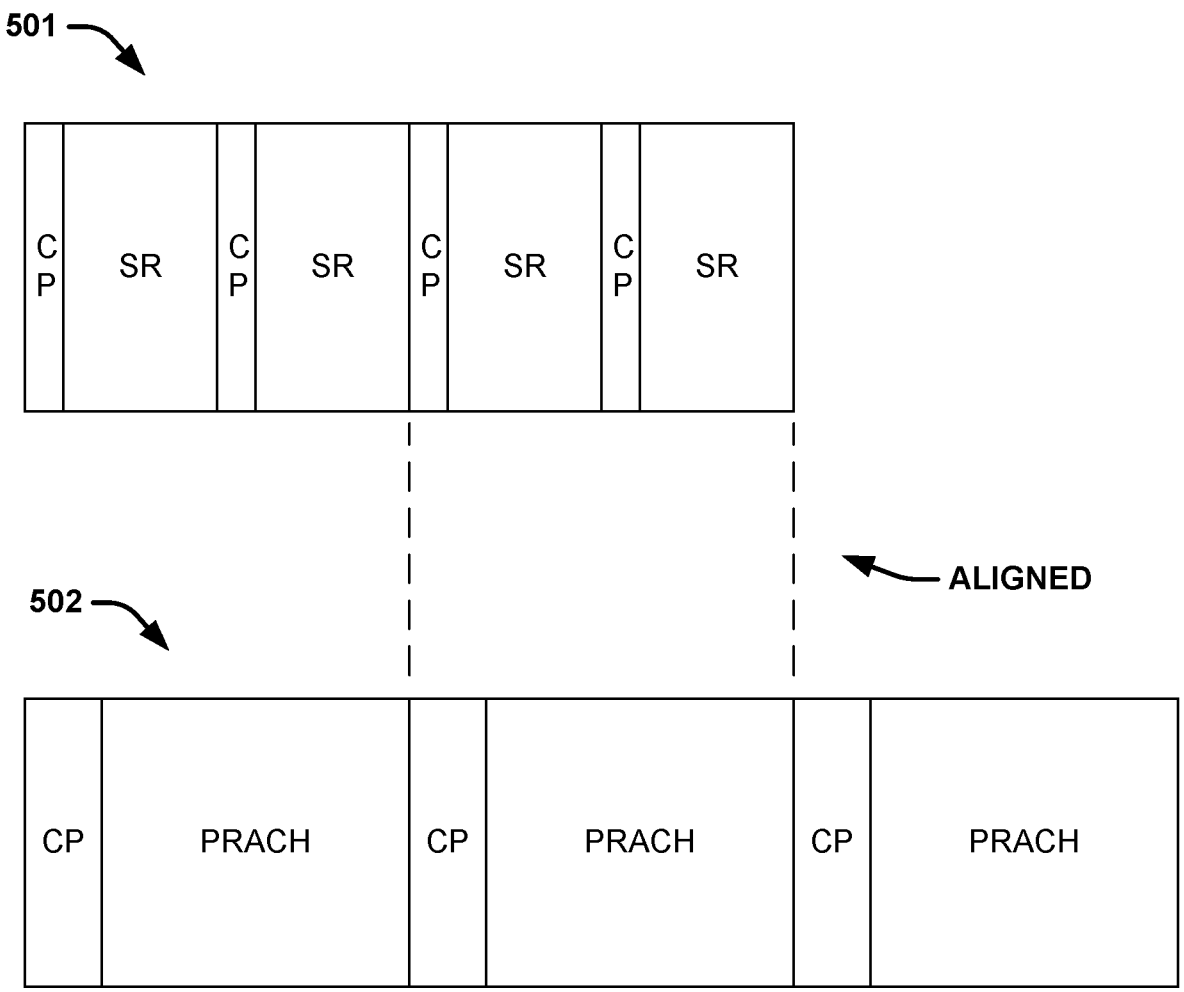
FIG. 5 is a diagram illustrating a recovery frame structure with beam correspondence in accordance with some embodiments.

FIG. 5 is a diagram illustrating a recovery frame structure 500 with beam correspondence in accordance with some embodiments. The structure 500 is provided for illustrative purposes and it is appreciated that components/elements can be included and/or omitted. Further, the structure 500 can be utilized with the system 400 and/or the system 100, described above.

The recovery frame structure 500 is also referred to as a frame structure type 1, which indicates that the structure is with beam correspondence.

A node, such as the gNB 402, can determine if beam correspondence is present or supported.

The frame structure 500 includes an SR portion/channel 501 and a PRACH portion/channel 502. The SR portion includes a cyclic prefix (CP) followed by an SR.

There are four SR channel repetitions shown in this example and a boundary, shown as CP, is present between each repetition.

The PRACH portion 502 includes a CP followed by a PRACH. There are also a plurality of repetitions with a CP boundary between each repetition.

The SR portion 501 is aligned with the PRACH portion 502, although the channel size/subframes/symbols used can vary. For example, a second PRACH boundary is aligned with a third SR boundary.

In one example, a UE device only sends an SR channel in one of the K repetitions (where that Rx beam is applied) so that a gNB can receive a beam recovery signal by one Rx beam. A transmission index within K repetitions used for the transmission of the SR channel can be configured by higher layers, such as radio resource control (RRC) signaling and the like.

Figure 6:
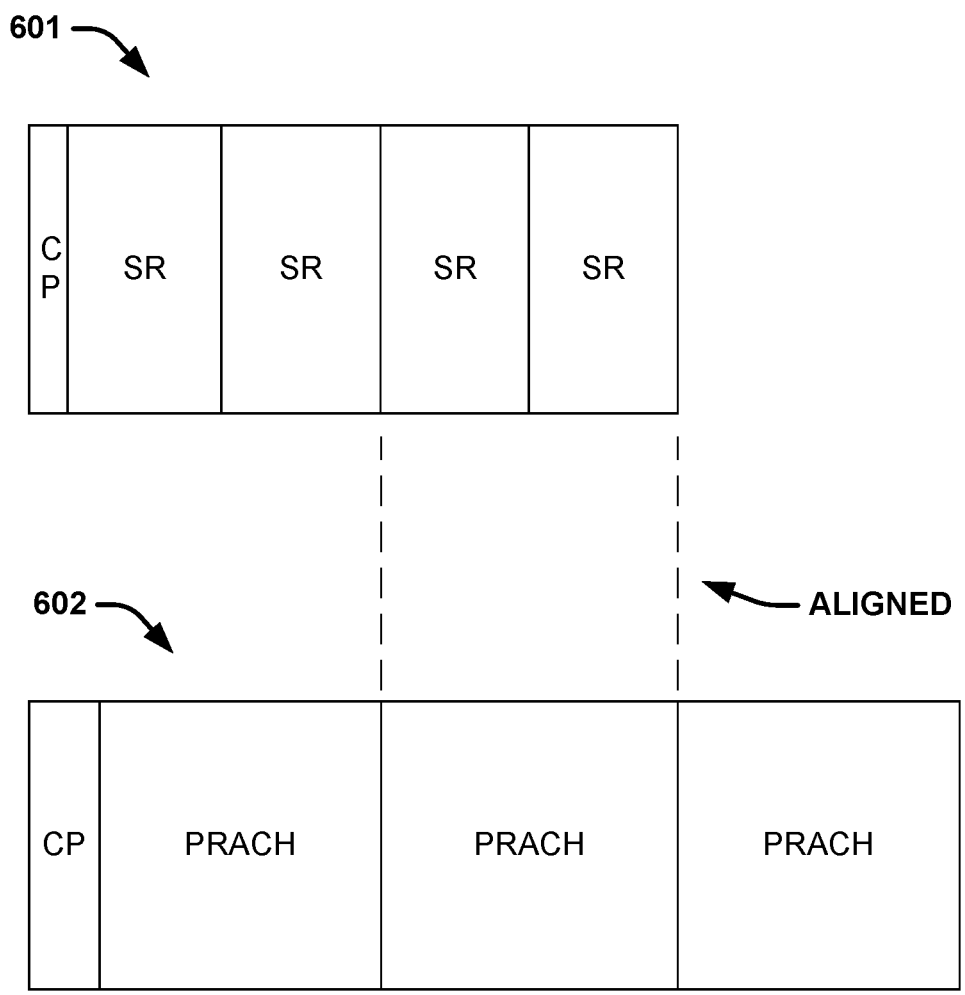
FIG. 6 is a diagram illustrating a recovery frame structure without beam correspondence in accordance with some embodiments.

FIG. 6 is a diagram illustrating a recovery frame structure 600 without beam correspondence in accordance with some embodiments. The structure 600 is provided for illustrative purposes and it is appreciated that components/elements can be included and/or omitted. Further, the structure 600 can be utilized with the system 400 and/or the system 100, described above.

The recovery frame structure 600 is also referred to as a frame structure type 2, which indicates that the structure is without beam correspondence. Type 2 can also include partial beam correspondence.

A node, such as the gNB 402, can determine if beam correspondence is present or supported.

The frame structure 600 includes an SR portion/channel 601 and a PRACH portion/channel 602. The SR portion includes a cyclic prefix (CP) followed by an SR.

There are four SR channel repetitions shown in this example and no boundary is present between each repetition.

The PRACH portion 602 includes a CP followed by a PRACH. There are also a plurality of repetitions between each repetition.

The SR portion 601 is aligned with the PRACH portion 602, although the channel size/subframes/symbols used can vary. For example, a second PRACH is aligned with a third SR.

The CP in the frame structure 600 (type 2) can be a long CP or include K short CPs. A short CP can be determined by one SR repetition.

In one example for the frame structure 600, a UE transmits the SR channel in every repetition so that the gNB can perform a beam sweeping operation. A tail/end part of one repetition can be viewed as the CP of the next repetition.

Figure 7:
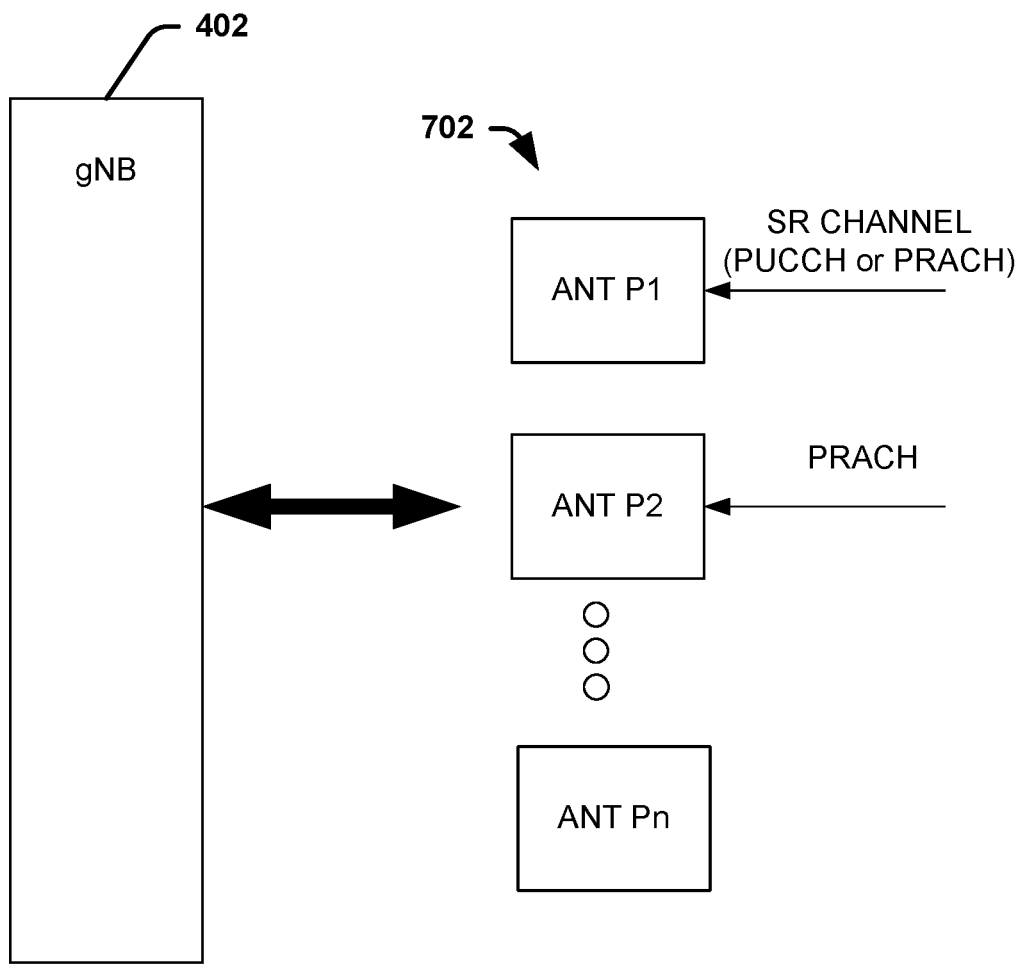
FIG. 7 is a diagram illustrating a non-aligned recovery frame structure in accordance with some embodiments.

FIG. 7 is a diagram illustrating a non-aligned recovery frame structure 700 in accordance with some embodiments. The structure 700 is provided for illustrative purposes and it is appreciated that additional components/elements can be included and/or omitted. Further, the structure 700 can be utilized with the system 400 and/or the system 100, described above.

In this example, a node, such as a gNB 402, has a plurality of antennas and/or antenna panels 702. As a result, different beam recovery channels can be received by different antenna panels without restrictions, such as aligning of recovery channels, aligning of repetition boundaries (CP) and the like. The non-aligned recovery frame 700 can be configured independently for each antenna panel.

FIG. 8 is a table 800 illustrating selection of recovery channels in accordance with some embodiments. The table 800 is provided for illustrative purposes and it is appreciated that additional components/elements can be included and/or omitted.

The table 800 is described with reference to the system 400 for illustrative purposes, however it is appreciated that the table can be utilizes with other nodes, systems and the like.

When the quality of a beam, including a control beam, falls below a quality threshold, both the PUCCH and the PRACH can be used to carry beam recovery signals. The UE 401 can then transmit the PUCCH and/or PRACH to the gNB 402 with information/recovery signals. Additionally, the UE 401 can use the PUCCH and/or PRACH to send a request to initiate beam recovery.

The gNB 402 uses the recovery signals to determine and/or establish a new beam to replace the prior beam that fell below the quality threshold.

The gNB 402 can designate which recovery channels are used by the UE 401 for beam recovery signals. Alternately, the recovery channels can be pre-determined, such as pre-determined in a specification.

The table 800 illustrates factors and/or characteristics for recovery channel selection. These factors are also referred to as recovery factors or recovery channel factors. The factors and/or characteristics can also apply to selection of a request recovery channel. A left side includes factors that favor selection of PRACH for beam recovery and a right side includes factors that favor selection of PUCCH for beam recover.

The factors for selecting PRACH for beam recovery include an omni (multi) directional UE and a directional UE without a configured PUCCH resource. The factors for selecting PUCCH for beam recovery include a directional UE.

A UE, such as the UE 401, can be configured to transmit in a single direction or multiple or all (OMNI) directions. If the UE 401 is directional, the gNB 402 selects the PUCCH as the beam recovery channel. If the UE is omni-directional, the gNB 402 selects the PRACH as the beam recovery channel.

Even if the UE is directional, there may not be a PUCCH resource available. In this case, the PRACH can still be selected.

In one example, the UE 401 is directional and uses a directional antenna. The UE can transmit the PUCCH to distinguish whether a beam recovery request is for a beam reporting or for a channel state information reference signal (CSI-RS) for UE receive (Rx) beam refinement.

FIG. 9 is a table 900 illustrating selection of recovery channels in accordance with some embodiments. The table 900 is provided for illustrative purposes and it is appreciated that additional components/elements can be included and/or omitted.

The table 900 is described with reference to the system 400 for illustrative purposes, however it is appreciated that the table can be utilizes with other nodes, systems and the like.

When the quality of a beam, including a control beam, falls below a quality threshold, both the PUCCH and the PRACH can be used to carry beam recovery signals. The UE 401 can then transmit the PUCCH and/or PRACH to the gNB 402 with information/recovery signals.

The gNB 402 uses the recovery signals to determine and/or establish a new beam to replace the prior beam that fell below the quality threshold.

The gNB 402 can designate which recovery channels are used by the UE 401 for beam recovery signals.

In this example, selection of a channel for beam recovery is based on gNB beam information or new beam information, including beam recovery. For example, the beam recovery can be based on CSI-RS from the UE or synchronization signals (primary synchronization signals (PSS) and/or secondary synchronization signals (SSS).

Different beams can be applied to a synchronization signal block (SS_Block) and CSI-RS. The SS_Block can include the use of SSS and/or PSS. The recovery selection can then be based on factors that include whether the new beam is to use an SS-Block or CSI-RS for beam recovery/formation.

Downlink (DL) gNB to UE beams in the SS-Block or CSI-RS can be one to one mapped to uplink (UL) UE to gNB beams in PRACH or PUCCH.

The table 900 illustrates factors and/or characteristics for recovery channel selection. These factors are also referred to as recovery factors or recovery channel factors. The factors and/or characteristics can also apply to selection of a request recovery channel. A left side includes factors that favor selection of PRACH for beam recovery and a right side includes factors that favor selection of PUCCH for beam recover.

The factors for selecting PRACH for beam recovery include that a new beam or beam recovery is identified/established using the SS-Block. Another factor is whether there is a configured PUCCH resource.

The factors for selecting PUCCH for beam recovery include that a new beam or beam recovery is identified/established using CSI-RS.

If the UE 401 is selecting the recovery channel, the gNB 402 can provide one or more of the factors using a message, transmission, signaling, and the like. In one example, the gNB 402 messages the UE 401 that a new beam is based on an SS-Block or CSI-RS using Msg3.

FIG. 10 is a table 1000 illustrating selection of recovery channels in accordance with some embodiments. The table 1000 is provided for illustrative purposes and it is appreciated that additional components/elements can be included and/or omitted. Recovery channel selection in this example is based on beam correspondence capabilities.

The table 1000 is described with reference to the system 400 for illustrative purposes, however it is appreciated that the table can be utilizes with other nodes, systems and the like.

When the quality of a beam, including a control beam, falls below a quality threshold, both the PUCCH and the PRACH can be used to carry beam recovery signals. The UE

401 can then transmit the PUCCH and/or PRACH to the gNB 402 with information/recovery signals.

The gNB 402 uses the recovery signals to determine and/or establish a new beam to replace the prior beam that fell below the quality threshold.

The gNB 402 can designate which recovery channels are used by the UE 401 for beam recovery signals.

In this example, selection of a channel for beam recovery is based beam correspondence capabilities of the UE 401 and/or the gNB 402.

Without beam correspondence, the UE 401 can directly report a new gNB index, antenna port index, resource index of CSI-RS, index of an SS-Blok and the like using a PUCCH. Other information can be included, such as an L1-reference signal received power (RSRP) for a new beam or beam recovery, a flag to indicate beam reporting, a flag to indicate whether a CSI-RS for beam refinement/recovery is required, and the like. In this example, without beam correspondence, the PUCCH can include:

index(es), such as a new gNB beam index, an antenna port (AP) index, a resource index, an index for a CSI-RS and an index of an SS-Block;

an L1-RSRP or compressed L1-RSRP of a new gNB beam;

a reporting flag to indicate whether beam reporting is requested; and a CSI-RS flag to indicate whether CSI-RS for UE Rx beam refinement is requested.

The table 1000 illustrates factors and/or characteristics for recovery channel selection. These factors are also referred to as recovery factors or recovery channel factors. The factors and/or characteristics can also apply to selection of a request recovery channel. A left side includes factors that favor selection of PRACH for beam recovery and a right side includes factors that favor selection of PUCCH for beam recover.

The factors for selecting PRACH for beam recovery include beam correspondence for the gNB 402 and/or the UE 401 or that there is not a configured PUCCH resource.

The factors for selecting PUCCH for beam recovery include an absence of beam correspondence capability in the gNB 402, the UE 401 or both the gNB 402 and the UE 401.

If the UE 401 is selecting the recovery channel, the gNB 402 can provide one or more of the factors using a message, transmission, signaling, and the like. In one example, the gNB 402 messages the UE 401 with information on beam recovery or a new beam using Msg3.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed within a base station. The apparatus comprises baseband circuitry which includes a radio frequency (RF) interface and one or more processors. The one or more processors are configured to select one or more recovery channels based on one or more recovery factors; determine a beam recovery frame structure using the selected one or more recovery channels based at least partially on beam correspondence capabilities; and provide the selected one or more recovery channels and the determined beam recovery frame structure to the RF interface for transmission to a user equipment (UE) device.

Example 2 includes the subject matter of Example 1, including or omitting optional elements, wherein the beam correspondence capabilities include that beam correspondence is supported by the base station and or the UE device.

Example 3 includes the subject matter of any of Examples 1-2, including or omitting optional elements, wherein the determined beam recovery frame structure includes a plurality of repetitions of a recovery channel, where each repetition includes a cyclic prefix (CP) as a time boundary.

Example 4 includes the subject matter of any of Examples 1-3, including or omitting optional elements, wherein the determined beam recovery frame structure includes a plurality of repetitions of a recovery channel, where each repetition omits a time boundary.

Example 5 includes the subject matter of any of Examples 1-4, including or omitting optional elements, wherein the one or more recovery channels include one or more of a physical random access channel (PRACH) and a physical uplink control channel (PUCCH).

Example 6 includes the subject matter of any of Examples 1-5, including or omitting optional elements, wherein the determined beam recovery frame structure aligns repetitions of the one or more recovery channels by time.

Example 7 includes the subject matter of any of Examples 1-6, including or omitting optional elements, wherein one or more processors are further configured to select a scaling factor K between a subcarrier spacing of a recovery channel to a beam recovery signal.

Example 8 includes the subject matter of any of Examples 1-7, including or omitting optional elements, wherein the scaling factor K is provided by higher layer signaling or downlink control information (DCI) or fixed.

Example 9 includes the subject matter of any of Examples 1-8, including or omitting optional elements, wherein the one or more processors are further configured to determine a frame structure for a first recovery channel independent of a frame structure for a second recovery channel and wherein the first recovery channel is not aligned with the second recovery channel.

Example 10 includes the subject matter of any of Examples 1-9, including or omitting optional elements, wherein the one or more processors are configured to initiate beam recovery on the quality of at least one maintained beam or a subset of maintained beams falling below a threshold.

Example 11 includes the subject matter of any of Examples 1-10, including or omitting optional elements, wherein the one or more processors are configured to perform beam sweeping using one or more recovery signals from a received recovery frame via the RF interface, where the received recovery frame is in accordance with the determined beam recovery frame structure.

Example 12 includes the subject matter of any of Examples 1-11, including or omitting optional elements, wherein the base station is a next Generation Node B (gNB).

Example 13 includes the subject matter of any of Examples 1-12, including or omitting optional elements, wherein the one or more recovery factors include a UE antenna structure of the UE device and the beam correspondence capabilities.

Example 14 is an apparatus configured to be employed within a user equipment (UE) device comprising baseband circuitry. The baseband circuitry includes a radio frequency (RF) interface and one or more processors. The RF interface is configured to receive a beam recovery frame structure from a base station. The one or more processors are configured generate one or more recovery signals based on the beam recovery frame structure; generate a recovery frame having a first recovery channel and a second recovery channel using the beam recovery frame structure; and provide the generated recovery frame to the RF interface for transmission to a base station.

Example 15 includes the subject matter of Example 14, including or omitting optional elements, wherein the one or more processors are further configured to determine the beam recovery frame structure.

Example 16 includes the subject matter of any of Examples 14-15, including or omitting optional elements, wherein the first recovery channel is a physical uplink control channel (PUCCH) and the second recovery channel is a physical random access channel (PRACH).

Example 17 includes the subject matter of any of Examples 14-16, including or omitting optional elements, wherein the one or more processors are further configured to select the first recovery channel and the second recovery channel based on recovery channel factors including beam correspondence capabilities, directionality of the UE device, and recovery signal type.

Example 18 includes the subject matter of Examples 14-17, including or omitting optional elements, wherein the recovery signal type is a synchronization signal block (SSB) or a channel state information reference signal (CSI-RS).

Example 19 includes the subject matter of any of Examples 14-18, including or omitting optional elements, wherein the one or more processors are further configured to select one or more recovery channels based on beam correspondence capabilities and to generate a beam recovery request using the selected one or more recovery channels.

Example 20 is one or more computer-readable media having instructions that, when executed, cause a base station to select a recovery channel based on recovery channel factors; receive one or more recovery signals from the selected recovery channel; and perform a beam sweeping operation to form an established beam.

Example 21 includes the subject matter of Example 20, including or omitting optional elements, wherein recovery channel factors include beam correspondence capabilities.

Example 22 includes the subject matter of any of Examples 20-21, including or omitting optional elements, wherein the instructions, when executed, further cause the base station to maintain a plurality of beams for a user equipment (UE) device and to initiate beam recovery on a beam quality for a beam of the plurality of beams being below a threshold.

Example 23 is an apparatus for a communication system having a base station and a user equipment (UE) device. The apparatus includes a means to initiate beam recovery upon a beam quality being below a threshold; a means to determine a beam recovery frame structure based at least partially on beam correspondence capabilities; a means to generate a recovery frame having one or more recovery signals using the beam recovery frame structure; and a means to perform beam recovery using the generated recovery frame.

Example 24 includes the subject matter of Example 23, including or omitting optional elements, further comprising a means to select a recovery channel based at least partially on the beam correspondence capabilities.

Example 25 includes the subject matter of any of Examples 23-24, including or omitting optional elements, further comprising a means to select one of a physical uplink control channel (PUCCH) and a physical random access channel (PRACH) to transmit a beam recovery request.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. An apparatus for a base station, comprising baseband circuitry having: a radio frequency (RF) interface; and
one or more processors configured to:
determine a beam recovery frame structure that includes one or more recovery channels associated with a configured PUCCH resource, wherein the beam recovery frame structure is based at least partially on beam correspondence capabilities;
receive a beam recovery signal corresponding to the beam recovery frame structure; and
select a scaling factor K between a subcarrier spacing of a recovery channel of the one or more recovery channels and the beam recovery signal.

2. The apparatus of claim 1, wherein the beam correspondence capabilities include that beam correspondence is supported by one or more of the base station or a user equipment (UE) device.

3. The apparatus of claim 1, wherein the determined beam recovery frame structure includes a plurality of repetitions of a recovery channel, where each repetition includes a cyclic prefix (CP) as a time boundary.

4. The apparatus of claim 1, wherein the determined beam recovery frame structure includes a plurality of repetitions of a recovery channel, where each repetition omits a time boundary.

5. The apparatus of claim 1, wherein the one or more recovery channels include one or more of a physical random access channel (PRACH) and a physical uplink control channel (PUCCH).

6. The apparatus of claim 1, wherein the determined beam recovery frame structure aligns repetitions of the one or more recovery channels by time.

7. The apparatus of claim 1, wherein the scaling factor K is provided by higher layer signaling or downlink control information (DCI).

8. The apparatus of claim 1, wherein the one or more processors are further configured to determine a frame structure for a first recovery channel independent of a frame structure for a second recovery channel and wherein the first recovery channel is not aligned with the second recovery channel.

9. The apparatus of claim 1, wherein the one or more processors are configured to initiate beam recovery on a quality of at least one maintained beam or a subset of maintained beams falling below a threshold.

10. The apparatus of claim 1, wherein the one or more processors are configured to perform beam sweeping using one or more beam recovery signals from a received recovery frame via the RF interface, where the received recovery frame is in accordance with the determined beam recovery frame structure.

11. The apparatus of claim 1, further configured to provide the determined beam recovery frame structure to the RF interface before receiving the beam recovery signal.

12. The apparatus of claim 1, wherein the one or more recovery channels are selected based on one or more recovery factors including a user equipment (UE) antenna structure of a UE device.

13. An apparatus for a user equipment (UE) device, comprising baseband circuitry having:
a radio frequency (RF) interface configured to receive a beam recovery frame structure that includes one or more recovery channels associated with a PUCCH resource; and
one or more processors configured to:
generate one or more beam recovery signals based on the beam recovery frame structure; and
transmit the one or more beam recovery signals wherein a scaling factor K is selected between a subcarrier spacing of the one or more recovery channels and the transmitted one or more beam recovery signals.

14. The apparatus of claim 13, wherein the one or more processors are further configured to determine the beam recovery frame structure.

15. The apparatus of claim 13, further configured to generate a recovery frame having a first recovery channel and a second recovery channel that is different from the first recovery channel using the beam recovery frame structure wherein the first recovery channel is a physical uplink control channel (PUCCH) and the second recovery channel is a physical random access channel (PRACH).

16. The apparatus of claim 13, further configured to generate a recovery frame having a first recovery channel and a second recovery channel that is different from the first recovery channel using the beam recovery frame structure wherein the one or more processors are further configured to select the first recovery channel and the second recovery channel based on recovery channel factors including beam correspondence capabilities, directionality of the UE device, and recovery signal type.

17. The apparatus of claim 16, wherein the recovery signal type is a synchronization signal block (SSB) or a channel state information reference signal (CSI-RS).

18. The apparatus of claim 13, wherein the one or more processors are further configured to select one or more recovery channels based on beam correspondence capabilities and to generate a beam recovery request using the selected one or more recovery channels.

19. A non-transitory computer-readable media having instructions that, when executed, cause a base station to:
    determine a beam recovery frame structure that includes a recovery channel associated with a configured PUCCH resource;
    receive one or more beam recovery signals associated with the recovery channel; and
    select a scaling factor K between a subcarrier spacing of the recovery channel and a beam recovery signal of the one or more beam recovery signals.

20. The non-transitory computer-readable media of claim 19, wherein the recovery channel is selected based on recovery channel factors that include beam correspondence capabilities.

21. The non-transitory computer-readable media of claim 19, wherein the instructions, when executed, further cause the base station to maintain a plurality of beams for a user equipment (UE) device and to initiate beam recovery on a beam quality for a beam of the plurality of beams being below a threshold.

* * * * *